United States Patent [19]

Redman et al.

[11] 4,139,304
[45] Feb. 13, 1979

[54] METHODS AND APPARATUS FOR MEASURING VARIATIONS IN DISTANCE TO A SURFACE

[75] Inventors: John D. Redman, Newbury; Michael R. Wall, Reading, both of England

[73] Assignee: National Research Development Corporation, London, England

[21] Appl. No.: 767,334

[22] Filed: Feb. 10, 1977

[51] Int. Cl.² .......................... G01B 9/02; G01B 11/24
[52] U.S. Cl. .................................. 356/358; 356/371; 356/376
[58] Field of Search ................... 250/237 G; 356/109, 356/120

[56] References Cited

U.S. PATENT DOCUMENTS

| | | | |
|---|---|---|---|
| 3,619,023 | 11/1971 | Brooks | 356/109 X |
| 3,943,278 | 3/1976 | Ramsey, Jr. | 356/109 X |

FOREIGN PATENT DOCUMENTS

| | | | |
|---|---|---|---|
| 2300328 | 9/1976 | France | 356/109 |
| 236025 | 1/1969 | U.S.S.R. | 356/109 |

OTHER PUBLICATIONS

Welford, "Some Applications of Projected Interference Fringes" Optica Acta, vol. 16, No. 3, pp. 371-376, 1969.

*Primary Examiner*—John K. Corbin
*Assistant Examiner*—Matthew W. Koren
*Attorney, Agent, or Firm*—Cushman, Darby & Cushman

[57] ABSTRACT

The invention is especially suitable for profile measurements on non-specular surfaces. The surface of interest is intersected by projected interference fringes generated by two intersecting coherent light beams. The intersected fringes are imaged at a photo-electric detector having a sensitive cross-sectional area relative to the fringe pitch, suitably half a fringe pitch, such as to produce an output variation if the fringes move relative to the detector. The phase of at least one of the beams is modulated to cause the fringes to shift laterally and cyclically across the surface, thereby causing the detector output to include a sinusoidal component whose phase depends on the distance to the imaged surface. The change in phase of this component, if and as the distance to the surface changes, is used to indicate the change in the distance.

To measure distance changes greater than the depth of focus of the detector, it is aranged that, after such a change, the detector moves axially to a refocussed position. The projected fringes may be moved simultaneously, allowing shallower, brighter, fringers to be used; in this case the amount of the focussing movements is combined with the measurements made between refocussing movements.

17 Claims, 4 Drawing Figures

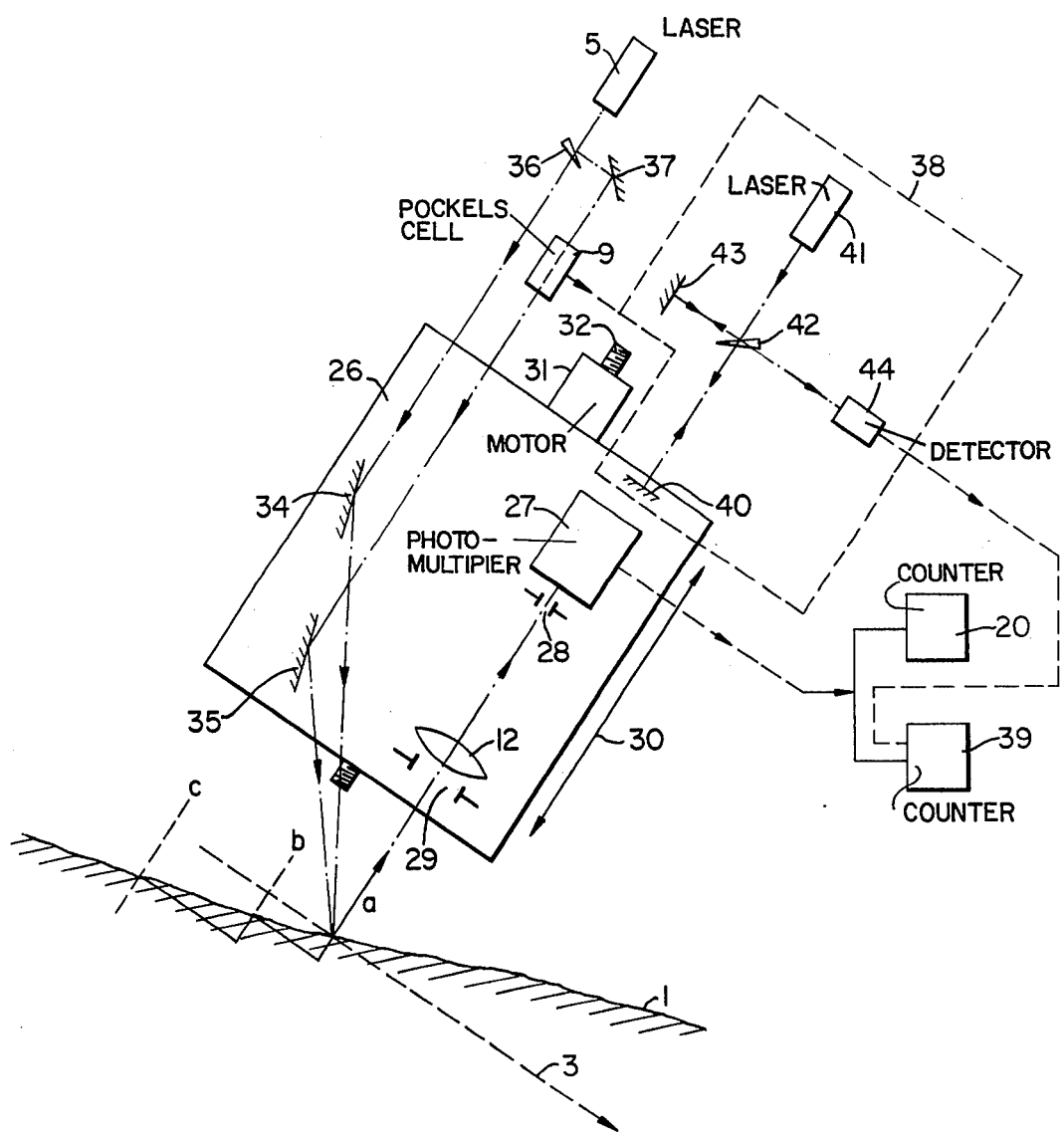

METHODS AND APPARATUS FOR MEASURING VARIATIONS IN DISTANCE TO A SURFACE

BACKGROUND OF THE INVENTION

This invention relates to methods and apparatus for measuring variations in distance to a surface, particularly for determining surface profiles or contours, and can also be used for measuring surface displacements.

The present invention is of particular value for profile measurements where the surface roughness is comparable with, or larger than, the wavelength of visible light, as with some machined surfaces. With specularly reflecting surfaces such measurements can readily be made using a conventional Michelson interferometer, but with such non-specular surfaces it is difficult or impossible to count the fringes as the surface moves laterally relative to the light beam of the interferometer; fringes due to displacement variations can be counted, but not profile variations.

The use of projected interference fringes generated by two beams of plane waves to contour an object surface has been described by Rowe and Welford in Nature, Vol 216, p786 and Optica Acta, Vol 16, p371. An array of sheets of light thus generated is caused to illuminate an object volume and a bright fringe appears wherever the object surface intersects one of these sheets. The fringes can thus be used to build up a contour map of the object.

The present invention provides a method which employs the above principle but which permits increased sensitivity and allows automatic read-out of the measured contour, and which can be used for rough surfaces.

SUMMARY OF THE INVENTION

According to the present invention a method of measuring variations in distance to a surface comprises:

generating an array of projected spaced-apart sheets of light which intersect the surface;

imaging the surface thus intersected on to a photoelectric detector having a cross-sectional dimension relative to the spacing of the imaged sheets at the detector such as to produce a variation in detector output if the imaged sheets move relative to the detector;

causing the sheets which intersect the surface to shift laterally and cyclically across the surface, thereby causing the detector output to include a sinusoidal component whose phase depends on the distance to the imaged surface;

and utilising the change in phase of said sinusoidal component, if and as the distance to the imaged surface changes, to indicate the change in the distance.

According to a preferred form of the present invention a method of measuring variations in distance to a surface comprises:

generating, by means of two intersecting mutually coherent light beams, projected interference fringes comprising sheets of light which intersect the surface;

imaging the intersected fringes on to a photo-electric detector having a sensitive cross-sectional dimension relative to the fringe pitch at the detector such as to produce a variation in detector output if the fringes move relative to the detector;

modulating the phase of at least one of the light beams whereby the fringes shift laterally and cyclically across the surface, thereby causing the detector output to include a sinusoidal component whose phase depends on the distance to the imaged surface;

and utilising the change in phase of said sinusoidal component, if and as the distance to the imaged surface changes, to indicate the change in the distance.

Preferably the projected interference fringes comprise substantially parallel and equispaced sheets of light.

Suitably the modulating waveform is a sawtooth waveform, and suitably the sensitive cross-sectional dimension of the detector is approximately half the imaged fringe pitch, or each of a plurality of such dimensions are approximately half the imaged fringe pitch spaced apart by the imaged fringe pitch.

Preferably the fringes are caused to shift through approximately an integral number of fringe pitches; suitably one fringe pitch, in which case the sinusoidal component has the cyclic frequency.

The phases of either one or both beams may be modulated; in the latter case a cyclic frequency which is the difference of the two modulation frequencies can be obtained.

In using the method, the surface of interest and the projected sheets of light are moved relative to one another (in addition to the aforesaid cyclic movement) either to image a different part of the surface at the detector (e.g. to measure the profile), or the same part at a different distance from the detector (e.g. to measure the displacement), the phase change resulting from this movement being a measure of the change of distance from the detector.

For measuring distance changes which exceed the depth of focus of the detector, the detector and/or associated focussing means may be moved axially relative to the surface to refocus the fringes, measurement of the surface being interrupted during such axial movement.

The projected fringes may be of small depth relative to the distance changes of interest and may be moved simultaneously with the aforesaid refocussing movement of the detector so that the fringes continue to illuminate a region about the focus of the detector, the amount of such movement being recorded and combined with the distance changes measured between the refocussing movements.

The amount of said refocussing movement may be recorded by utilising the change of phase of said sinusoidal component as aforesaid during the movement. Alternatively the refocussing movement may be measured by a separate measuring method of higher accuracy, such as conventional interferometry.

The present invention also provides apparatus for use in a method as aforesaid.

DESCRIPTION OF THE DRAWINGS

To enable the nature of the present invention to be more readily understood, attention is directed, by way of example, to the accompanying drawings wherein:

FIG. 4 is a diagram of a third embodiment of the invention.

In FIG. 1 an object surface 1 is mounted on a carrier 2 which is slidable to and fro in the direction of arrow 3. The surface 1 whose profile is to be examined is exposed to a composite light beam 4 whose structure is described hereafter. For simplicity of explanation FIG. 1 shows a nominally flat surface 1 which extends in the plane of arrow 3 but includes a ramp-like deviation $1^1$ whose profile is being examined. In practice the surface whose profile is to be measured may be curved or irregular rather than nominally flat as here.

Figure 1:
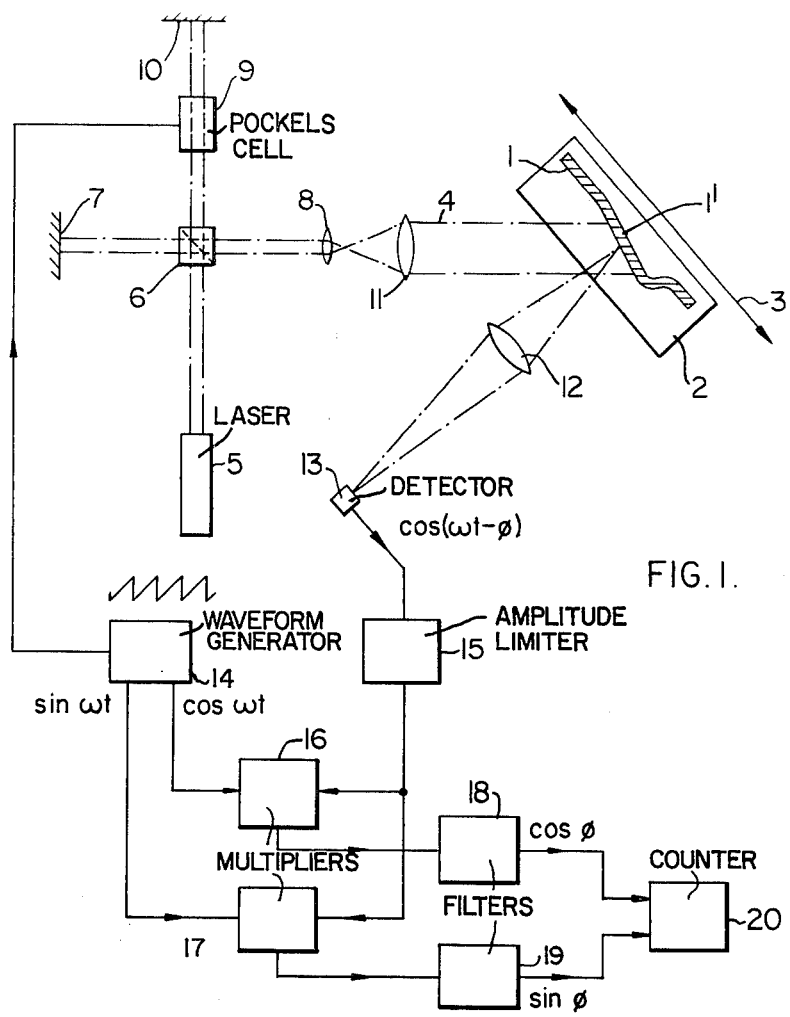
FIG. 1 is an optical and block schematic diagram of one embodiment of the invention as applied to determining a surface profile.

The light beam 4 is derived from a CW laser 5, suitably a He-Ne laser, whose output beam impinges on a beam-splitter 6. One part of this beam is reflected to a mirror 7 and back through the beam-splitter to a lens 8. The non-reflected part of this beam passes through a Pockels cell 9 to a mirror 10 and back through the cell to the beam-splitter, whence it also is reflected to the lens 8.

Mirrors 7 and 10 are not exactly at right angles. The two mutually coherent beams travelling to lens 8 are therefore not parallel to one another but are inclined at a small angle. They therefore generate projected interference fringes, as explained in the aforementioned references. These fringes constitute, in effect, parallel sheets of light normal to the plane of FIG. 1 and extending in the direction of the bisector of the angle between the beams. The sheets are separated by a distance $\lambda/(2 \sin \theta)$, where $\lambda$ is the wavelength of the light and $\theta$ is the angle between each beam and the bisector.

Lens 8 with lens 11 form a "telescope" to enable a larger area of the object surface to be illuminated by the projected fringes which form the beam 4, but the use of such a telescope is not essential. (The above angle $\theta$ is the angle between the bisector and each beam leaving lens 11.)

The surface of object 1 is imaged by a lens 12 on to the surface of a photoelectric detector 13 whose sensitive area has a diameter approximately half that of the imaged fringe pitch, e.g. a PIN (Positive Intrinsic Negative) photo-diode such as the EG and G Type SGD 040 A having a sensitive diameter of 1.02 mm. The detector can thus discriminate between adjacent fringes.

Figure 2:
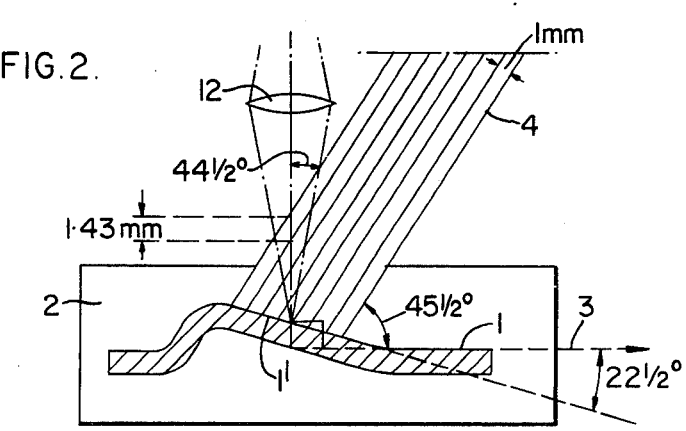
FIG. 2 shows part of FIG. 1 to an enlarged scale.

In FIG. 2 the sheets of light 4 are shown as intersecting the object surface 1 at an angle of 45½° and the ramp surface $1^1$ is inclined at an angle of 22½° to the object surface and to the direction of movement (arrow 3). The direction of movement is normal to the viewing direction (the direction to detector 13) and the angle between the sheets and the viewing direction 13 is 44¼°. If the angle $2\theta$ (not shown) between the two interfering beams is made such that the fringe pitch is 1 mm as shown, then it will be seen that a movement of the surface in the direction 3 such that the area imaged at detector 13 executes one cycle of illumination, corresponds to a change in the distance to the detector of 1.43 mm as shown. It will be appreciated that the above values are shown to illustrate the geometric relationship of the system, but that the method is not limited to these or similar values. There should, however, be a substantial angle between the direction of the sheets of light and the viewing direction (44½° in the present demonstration) in the interest of good sensitivity. (If they are parallel to one another the sensitivity is seen to be zero). A viewing direction normal to the surface, as shown, will often be convenient for simplicity of measurement.

Returning to FIG. 1, an electronic waveform generator 14 applies a sawtooth waveform (sometimes termed a ramp waveform) to the Pockels cell 9. This modulates the phase of the light beam passing through the cell, and causes the projected fringes at the surface 1 to shift steadily and linearly across the surface through one fringe pitch during each sloping part of the waveform, flying back rapidly at the end of each such part to recommence the shift. The amplitude of the applied waveform is adjusted such that the shift is at least approximately one fringe pitch, but the exact degree of shift is not critical; nor is the linearity of the slope and the speed of the fly-back portion. Suitably the frequency of the sawtooth waveform may be about 10 kHz but frequencies down to 70 Hz have been used. Other known phase-changing devices can be used and other modulating waveforms are possible. However with the electronic method for deriving the phase information to be described in the succeeding paragraph, the fringes must appear predominantly to move in one direction and not merely to oscillate to and fro. Thus in the sawtooth waveform the fly-back should be short relative to the sloping part (it must not be comparable to half the sloping part.)

Under the described conditions, the output of detector 13 has a substantial component of the form $\cos(\omega t - \phi)$, where $\omega$ is $2\pi \times$ the frequency of the modulating waveform and $\phi$ is a phase angle whose value depends on the distance from the surface 1 to the detector 13. After passing through an amplitude limiter 15, this output is fed to electronic multipliers 16 and 17 where it is multiplied with sinusoidal reference signals $\cos \omega t$ and $\sin \omega t$ respectively produced by waveform generator 14 in synchronism with the sawtooth waveform applied to the Pockels cell. The output of each multiplier is fed to low-pass filters 18 and 19 to derive $\cos \phi$ and $\sin \phi$ signals. The latter are fed to the two inputs of an up-down counter 20.

If surface $1^1$ remains stationary relative to detector 13, the value of $\phi$ also remains at a steady "DC" value. However if the carrier 2 is moved in the direction of the arrow 3, the value of $\phi$ changes as the range to the detector changes and consecutive fringes are imaged at the detector (e.g. if the movement in direction 3 is of constant velocity, $\cos \phi$ and $\sin \phi$ become time-varying sinusoidal functions, whose frequency depends on the velocity.) By making counter 20 count each time these functions cross zero, i.e. each time the phase angle $\phi$ changes by $\pi/2$, each count represents a change in distance to detector 13 of 1.43 mm/4, i.e, approx 0.36 mm. The direction of the change is indicated, in a known manner, by whether the count increases or decreases. It will be appreciated that the foregoing values are by way of demonstration of the principle. By increasing $\theta$ to produce a fringe pitch of 25 micron (instead of 1 mm), i.e. comparable with that used by Rowe and Welford, and available lasers, detectors, etc., the distance to the surface can be measured to within ± 2.5 micron or less.

The present invention is not limited to the above-described arrangement for utilising the phase information $\phi$ contained in the signal from detector 13, as a measure of the distance to the surface. Other arrangements known in the arts of interferometric measurement and electronic phase measurement can be used. Nor need the sheets of light necessarily be generated, as described, by the two-beam interference method of Rowe and Welford.

Instead of moving the object surface laterally relative to a fixed detector to examine the surface profile, as in the above explanation, the detector and illuminating system can be moved laterally relative to the surface. The former arrangement will usually be the more convenient however. A spherical or cylindrical surface can be rotated about its axis.

Figure 3:
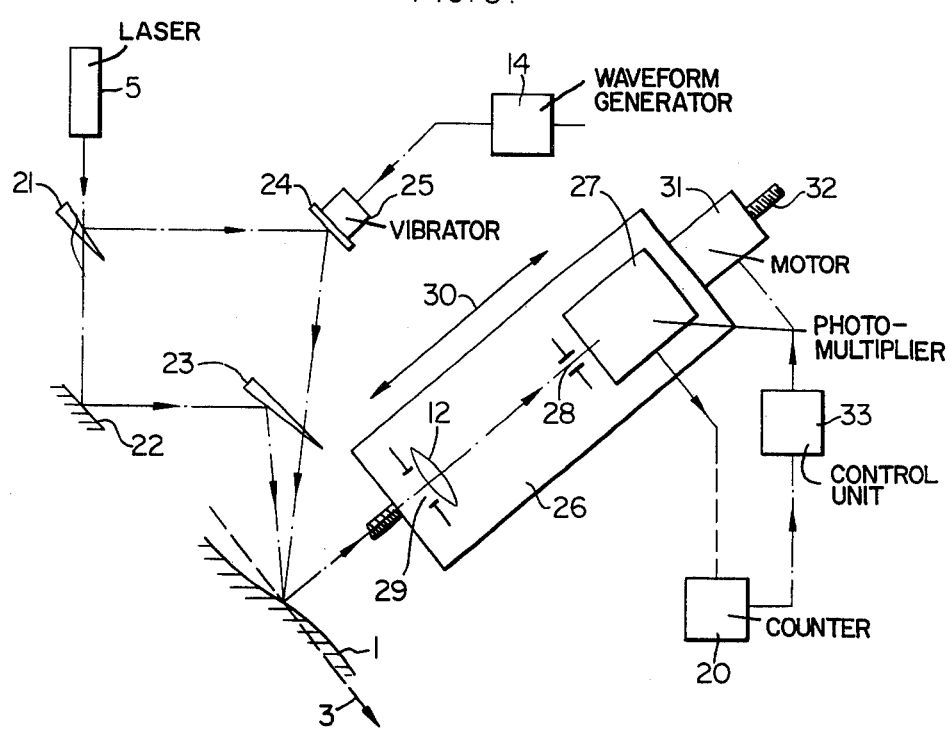
FIG. 3 is a diagram of a second embodiment of the invention.

The arrangement of FIG. 1 is satisfactory so long as the variations in the distance of the surface 1 from the detector 13 do not exceed the depth of focus of the fringes imaged at the detector. For a system arranged to measure to about 1 micron, the permissible variation for this reason may be of the order of 250 microns before defocussing of the image (blurring of the fringes) reduces the detector output signal to an undesirable level. In the embodiment of FIG. 3 this difficulty is overcome by arranging that the detector is refocussed on the surface when the change in distance becomes too great, thereby giving the device a greater range.

FIG. 3 uses the same numerals as FIG. 1 for corresponding items. It also illustrates an alternative arrangement for generating the fringes comprising a laser 5 whose output is divided by a beam-splitter 21 into two parts. A first part is reflected by mirror 22 and beam-combiner 23 on to the surface 1. The other part is reflected from a mirror 24 mounted on a piezo-electric vibrator 25 in a known manner to modulate its phase, and thereafter converges with the first part to produce sheets of light parallel to the bisector of the angle between the two parts as in FIG. 1.

The detector arrangement comprises a carriage 26 on which is mounted a photomultiplier tube 27 preceded by a narrow slit 28 whose width is approximately half a fringe pitch as imaged by lens 12, the slit being parallel to the imaged fringes. The latter is preceded by a conventional aperture 29. Tube 27 and slit 28 form an alternative detector to the PIN diode in FIG. 1. Carriage 26 is moveable in the direction of the axis of lens 12, as indicated by arrow 30, by means of a motor 31 cooperating with a fixed lead-screw 32, though any other convenient means of obtaining accurately controllable linear movement can be used. Motor 32 is controlled by unit 33 which receives an input from counter 20.

In use the carriage is adjusted so that the fringes on the surface are imaged in focus at slit 28 and, to measure profile, the surface is then moved in lateral direction 3 as in FIG. 1. If the distance to the surface changes by more than the predetermined depth of focus, as measured by the number of fringes counted, movement of the surface is stopped and unit 33 causes the carriage 26 to move a predetermined distance in the appropriate direction until the focussed condition is restored. The count reached prior to refocussing remains unchanged during the refocussing movement. After this refocussing, lateral movement of surface 1 is restarted, and the counter continues to record the counted fringes from where it left off. If the surface distance again changes by more than the focus range, the refocussing process is repeated. Instead of carriage 26 being moved in response to a predetermined count change, it may be arranged that it moves by a predetermined amount in response to a minimum detector signal output level, representing a given degree of defocussing. The carriage can also be moved manually, instead of by a motor.

In a modified form of FIG. 3 only the lens 12 or the slit 28 and tube 27 are moved to refocus, not both. This simpler arrangement may be satisfactory for measuring small distance ranges, but less so for greater ranges where it may, for example, produce an undesirably large change in the pitch scale as imaged.

The arrangement of FIG. 3 is satisfactory so long as the change in distance to the surface does not exceed the usable depth of the fringes produced by the convergent beams. It will be apparent that in order to cover a distance range say 2.5 cm deep, beams of substantial width must be used, which is wasteful of light. Moreover, to measure to $\pm$ 1 micron in 2.5 cm, for example, the fringes should preferably not be distorted or curved within this depth, which is difficult to achieve. Otherwise correction or calibration factors may be required.

FIG. 4 shows an embodiment which requires only fringes of relatively small depth to be provided, allowing narrower beams to be used and thus brighter fringes to be produced. In FIG. 4, which again uses similar numerals as before for similar items, the detector arrangement is similar to that of FIG. 3 and is mounted on a similarly moveable carriage 26. Also mounted on this carriage are two mirrors 34, 35 which respectively receive two parts of the beam of laser 5. Mirror 34 receives one part from beam-splitter 36. Mirror 35 receives the other part from the beam-splitter via mirror 37 and Pockels cell 9. The beams from mirrors 34 and 35 converge at a point on the axis of lens 12 which is in focus at slit 28, and generate projected fringes thereat. With this arrangement as the carriage moves to maintain the fringes in focus at slit 28 (as described with reference to FIG. 3), the mirrors 34 and 35 move with it, thereby ensuring that the fringes continue to illuminate a region about the focus of the detector and allowing fringes of relatively small depth (i.e. relatively narrow beams) to be used.

Disregarding for the present the items shown within the interrupted line 38, the arrangement functions as follows. Because the projected fringes now move relative to the surface when the carriage 26 moves to effect refocussing, the successive refocussed positions of the carriage cannot be fixed with reference to the fringe count and the single counter 20 of FIG. 3 is no longer sufficient. An additional counter 39 is now required to accumulate the counts made during successive refocussed movements.

Assume, for example, that in FIG. 4 point a of the surface 1 is initially imaged at slit 28. At this instant let the two recorders indicate as follows:

Counter 20   O
Counter 39   O

Now move surface 1 in the direction of arrow 3 until point b is imaged at the counter, and assume this is the maximum change in distance allowed by the depth of focus of the detector optical system. Assume the counters now read Counter 20   N
Counter 39   O To refocus, carriage 26 moves towards the surface, the fringe counts as it moves being subtracted from counter 20 until it reads O or approximately so (the precise number does not matter) and the subtracted counts being added to counter 39 so that they now read:

Counter 20   O
Counter 39   N

Measurement is now resumed by moving surface 1 to position c where the counters read:

Counter 20   N
Counter 39   N

Here refocussing is again required, after which the counters read:

Counter 20   O
Counter 39   2N and so on. The distance to any point on the surface is therefore given by the instantaneous value of the count in counter 20 plus the accumulated count in counter 39. The process is analogous to using a relatively short calibrated ruler to measure a long distance by moving the ruler through its own length sufficient times to nearly complete the distance, and then adding the part of its length which completes the distance. Counter 39 records the number of movements multiplied by the ruler length, and counter 20 records the part of its length which completes the distance.

In the FIG. 4 arrangement as described above, the accuracy of the final measurement depends on the accuracy with which the fringe pitch is known. It is in the nature of the projected fringes produced by the convergent beams that this pitch cannot be known with very great accuracy; not with the accuracy with which the fringe pitch in a conventional Michelson interferometer can be known, for example, where the accuracy depends only on the light wavelength and the latter is known accurately. A small inaccuracy in the projected fringe pitch is not important so far as the count in counter 20 is concerned, but it will be cumulative for the count in counter 39 (corresponding to a small error in the length of the above ruler) and can lead to a comparatively large error when the two counts are added.

This inaccuracy can be overcome by using a separate high-accuracy measuring arrangement to measure and record the refocussing movements of carriage 26, and such an arrangement is shown within the interrupted line 38 in FIG. 4. It is a conventional Michelson interferometer arrangement comprising a specular reflector 40 mounted on the carriage, a laser 41, a beam-splitter 42, a fixed specular reflector 43 and a detector 44 which counts fringes as the carriage moves, in a known manner. This count is fed to counter 39 during refocussing movements, instead of projected fringe counts. The distance to any point on the surface is now given by the sum of the interferometer fringe count on counter 39 plus the projected fringe count on counter 20.

In all the foregoing embodiments only a single half-fringe is viewed by the detector, either by the sensitive area of the photo-diode in FIG. 1 or by a single slit in FIGS. 3 and 4. In order to obtain a larger signal, multiple parallel slits may be used whose separation is matched to the pitch of the imaged fringes, thereby allowing more light to reach the detector. Alternatively a line of separate small photo-detectors may be used, separated by the fringe pitch.

Only one of the two convergent light beams is modulated in each of the foregoing arrangements. This is satisfactory for relatively low modulation frequencies, but high modulation frequencies can be advantageous in some applications, e.g. where it is desired to move the surface rapidly with respect to the detector, and/or to observe fast changes in the surface profile. A high modulation frequency also reduces problems caused by vibration. For a desired modulation frequency of 100 kHz, for example, it may be more convenient to employ a heterodyne principle by modulating both light beams. Efficient acousto-optical modulators are available for the range 1-20 MHz. By modulating one beam at, say, 1 MHz and the other at 1.1 MHz, the effect is to shift the projected fringes at the heterodyne frequency of 100 kHz.

We claim:

1. A method of measuring variations in distance to a surface comprising:

generating an array of projected spaced-apart sheets of light which intersect the surface;

imaging the surface thus intersected on to a photoelectric detector having a cross-sectional dimension relative to the spacing of the imaged sheets at the detector such as to produce a variation in detector output if the imaged sheets move relative to the detector;

causing the sheets which intersect the surface to shift laterally and cyclically across the surface, thereby causing the detector output to include a sinusoidal component whose phase depends on the distance to the imaged surface;

and utilising the change in phase of said sinusoidal component, if and as the distance to the imaged surface changes, to indicate the change in the distance.

2. A method of measuring variations in distance to a surface comprising:

generating, by means of two intersecting mutually coherent light beams, projected interference fringes comprising sheets of light which intersect the surface;

imaging the intersected fringes on to a photo-electric detector having a sensitive cross-sectional dimension relative to the fringe pitch at the detector such as to produce a variation in detector output if the fringes move relative to the detector;

modulating the phase of at least one of the light beams whereby the fringes shift laterally and cyclically across the surface, thereby causing the detector output to include a sinusoidal component whose phase depends on the distance to the imaged surface;

and utilising the change in phase of said sinusoidal component, if and as the distance to the imaged surface changes, to indicate the change in the distance.

3. A method as claimed in claim 2, wherein the projected interference fringes comprise substantially parallel and equispaced sheets of light.

4. A method as claimed in claim 2 wherein the modulating waveform is a sawtooth waveform.

5. A method as claimed in claim 2 wherein said cross-sectional dimension of the detector is approximately half the imaged fringe pitch.

6. A method as claimed in claim 2 wherein the fringes are caused to shift through approximately an integral number of fringe pitches.

7. A method as claimed in claim 6 wherein said number if unity.

8. A method as claimed in claim 2 wherein the viewing direction, i.e. the direction from the object surface to the detector, makes a substantial angle with the sheets of light.

9. A method as claimed in claim 2, for measuring distance changes which exceed the depth of focus of the detector, wherein the detector and/or its associated focussing means are moved axially relative to the surface to refocus the fringes at the detector, measurement of the surface being interrupted during such axial movement.

10. A method as claimed in claim 9, wherein said fringes are moved simultaneously with said movement of the detector and/or its associated focussing means so that the fringes continue to illuminate a region about the focus of the detector, the amount of such movement being recorded and combined with the distance changes measured between said movements of the detector and/or its associated focussing means and of said fringes.

11. A method as claimed in claim 10 wherein the amount of said refocussing movement is recorded by utilising the change of phase of said sinusoidal component during said movement.

12. A method as claimed in claim 10 wherein the amount of said refocussing movement is measured by a separate method of higher accuracy, for example by conventional interferometry.

13. A method as claimed in claim 12, wherein the separate method is conventional interferometry.

14. A method as claimed in claim 2 wherein the phase of one only of the light beams is modulated.

15. A method as claimed in claim 2 wherein the phase of both light beams is modulated.

16. Apparatus for measuring variations in distance to a surface comprising:
  means for generating an array of projected spaced-apart sheets of light which intersect the surface;
  means for imaging the surface thus intersected onto a photoelectric detector having a cross-sectional dimension relative to the spacing of the imaged sheets at the detector such as to produce a variation in detector output if the imaged sheets move relative to the detector;
  means for causing the sheets which intersect the surface to shift laterally and cyclically across the surface, thereby causing the detector to include a sinusoidal component whose phase depends on the distance to the imaged surface; and
  means for utilizing the change in phase of said sinusoidal component, if and as the distance to the imaged surface changes, to indicate the change in the distance.

17. Apparatus for measuring variations in distance to a surface comprising:
  means for generating, by means of two intersecting mutually coherent light beams, projected interference fringes comprising sheets of light which intersect the surface;
  means for imaging the intersected fringes onto a photo-electric detector having a sensitive cross-sectional dimension relative to the fringe pitch at the detector such as to produce a variation in detector output if the fringes move relative to the detector;
  means for modulating the phase of at least one of the light beams whereby the fringes shift laterally and cyclically across the surface, thereby causing the detector output to include a sinusoidal component whose phase depends on the distance to the imaged surface; and
  means for utilizing the change in phase of said sinusoidal component, if and as the distance to the imaged surface changes, to indicate the change in the distance.